(12) United States Patent
Shah et al.

(10) Patent No.: US 11,120,603 B2
(45) Date of Patent: Sep. 14, 2021

(54) HEAVY-WEIGHT/LIGHT-WEIGHT GPU SHADER CORE PAIR ARCHITECTURE

(71) Applicant: Samsung Electronics Co., Ltd., Suwon-si (KR)

(72) Inventors: Tejash M. Shah, Austin, TX (US); Mark Greenberg, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/538,819

(22) Filed: Aug. 12, 2019

(65) Prior Publication Data

US 2020/0402287 A1  Dec. 24, 2020

Related U.S. Application Data

(60) Provisional application No. 62/863,241, filed on Jun. 18, 2019.

(51) Int. Cl.

| | | |
|---|---|---|
| *G06T 15/50* | (2011.01) | |
| *G06T 15/00* | (2011.01) | |
| *G06F 11/34* | (2006.01) | |
| *G06F 9/48* | (2006.01) | |
| *G06F 9/355* | (2018.01) | |
| *G06F 9/38* | (2018.01) | |
| *G06F 9/30* | (2018.01) | |

(52) U.S. Cl.
CPC ........ *G06T 15/005* (2013.01); *G06F 9/30043* (2013.01); *G06F 9/3555* (2013.01); *G06F 9/3877* (2013.01); *G06F 9/4881* (2013.01); *G06F 11/3466* (2013.01)

(58) Field of Classification Search
CPC ....... G06T 15/506; G06T 15/50; G06T 15/80; G06T 15/60; G06T 15/06
USPC .......................................................... 345/426
See application file for complete search history.

(56) References Cited

U.S. PATENT DOCUMENTS

| | | |
|---|---|---|
| 9,202,308 B2 | 12/2015 | Keramidas et al. |
| 9,679,347 B2 | 6/2017 | Mei et al. |
| 10,062,139 B2 | 8/2018 | Kazakov et al. |
| 10,261,903 B2 | 4/2019 | Sakthivel et al. |
| 2015/0324198 A1* | 11/2015 | Alsup ................. G06F 9/30145 712/233 |
| 2017/0123794 A1* | 5/2017 | Chen ..................... G06F 9/3012 |
| 2018/0033114 A1 | 2/2018 | Chen et al. |
| 2018/0286112 A1* | 10/2018 | Lauritzen ................ G06T 17/20 |

(Continued)

*Primary Examiner* — Gordon G Liu
(74) *Attorney, Agent, or Firm* — Renaissance IP Law Group LLP

(57) ABSTRACT

A shader core includes a first processing element (PE), a second processing element, a register file and a warp sequencing unit. The first PE includes a first predetermined number of execution units, and the second PE includes a second predetermined number of execution units in which the second predetermined number of execution units is less than the first predetermined number of execution units. The register file shared by the first PE and the second PE. The warp sequencer unit (WSQ) is coupled to the first PE and to the second PE and schedules an instruction trace to execute on the first PE or the second PE based on information contained in a trace header of the instruction trace. The information contained in the trace header indicates whether the instruction trace is executable on the second PE.

19 Claims, 3 Drawing Sheets

(56) References Cited

U.S. PATENT DOCUMENTS

2018/0293784 A1* 10/2018 Benthin ................ G06T 9/001
2018/0300131 A1* 10/2018 Tannenbaum ........ G06F 9/3851

* cited by examiner

HEAVY-WEIGHT/LIGHT-WEIGHT GPU SHADER CORE PAIR ARCHITECTURE

CROSS-REFERENCE TO RELATED APPLICATION

This application claims the priority benefit under 35 U.S.C. § 119(e) of U.S. Provisional Application No. 62/863,241, filed on Jun. 18, 2019, the disclosure of which is incorporated herein by reference in its entirety.

TECHNICAL FIELD

The subject matter disclosed herein relates to graphics processing units (GPUs). More specifically, the subject matter disclosed herein relates to a shader core having an improved performance without processing engines (PEs) being replicated and without generally doubling the size of the shader core.

BACKGROUND

Execution of a shader program in a GPU is typically performed in a shader core. One way to increase the performance of a GPU is by increasing the number of PEs in a shader core by replicating the PEs along with additional support associated with a of a warp sequencer unit to schedule instructions for the additional PEs. A drawback to such an approach is that the additional PEs and support structure increase the overall size, or area, of the shader core.

SUMMARY

An example embodiment provides a shader core that may include a first PE, a second PE, a register file and a warp sequencer unit (WSQ). The first PE may include a first predetermined number of execution units. The second PE may include a second predetermined number of execution units in which the second predetermined number of execution units may be less than the first predetermined number of execution units. The register file may be shared by the first PE and the second PE. The WSQ may be coupled to the first PE and to the second PE, and the WSQ may schedule an instruction trace to execute on the first PE or the second PE based on information contained in a trace header of the instruction trace. In one embodiment, the information contained in the trace header may indicate whether the instruction trace is executable on the second PE. In another embodiment, the shader core may include a load-store unit (LSU) coupled to the first PE, and the LSU may access the register file through the first PE.

An example embodiment provides a GPU that may include at least one shader core. The shader core may include a first PE, a second PE, a register file, an LSU, and a warp sequencer unit (WSQ). The first PE may include a first predetermined number of execution units. The second PE may include a second predetermined number of execution units in which the second predetermined number of execution units may be less than the first predetermined number of execution units. The register file may be shared by the first PE and the second PE. The WSQ may be coupled to the first PE and to the second PE, and the WSQ may schedule an instruction trace to execute on the first PE or the second PE based on information contained in a trace header of the instruction trace. The LSU may be coupled to the first PE, and the LSU may access the register file through the first PE. The WSQ may be coupled to the first PE and to the second PE. The WSQ may schedule an instruction trace to execute on the first PE or the second PE based on information contained in a trace header of the instruction trace. In one embodiment, the information contained in the trace header may indicate whether the instruction trace is executable on the second PE. In another embodiment, the first predetermined number of execution units may include a third predetermined number of types of execution units, and the second predetermined number of execution units may include a fourth predetermined number of types of execution units in which the fourth predetermined number of types of execution units is less than the third predetermined number of types of execution units. In one embodiment, the fourth predetermined number of types of execution units may include a floating-point-type of execution unit and an integer-processing-type of execution unit. In another embodiment, the third predetermined number of types of execution units may include at least one of a floating-point-type of execution unit, an integer-processing-type of execution unit, a sine-function-type of execution unit, a cosine-function-type of execution number, a reciprocal-function-type of execution unit, a square-root-function-type of execution unit, and a format-conversion-type execution unit. In one embodiment, the register file may include a vector register file and a scalar register file, in which the vector register file may include two read ports and two write ports, and in which the scalar register file may include two read ports and two write ports.

An example embodiment provides a GPU that may include at least one shader core. The shader core may include a first PE, a second PE a register file, an LSU, and a WSQ. The first PE may include a first predetermined number of types of execution units. The second PE may include a second predetermined number of types of execution units in which the second predetermined number of types of execution units may be less than the first predetermined number of types of execution units. The register file may be shared by the first PE and the second PE. The LSU may be coupled to the first PE, and the LSU may access the register file through the first PE. The WSQ may be coupled to the first PE and to the second PE. The WSQ may schedule an instruction trace to execute on the first PE or the second PE based on information contained in a trace header of the instruction trace in which the information contained in the trace header may indicate whether the instruction trace is executable on the second PE.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
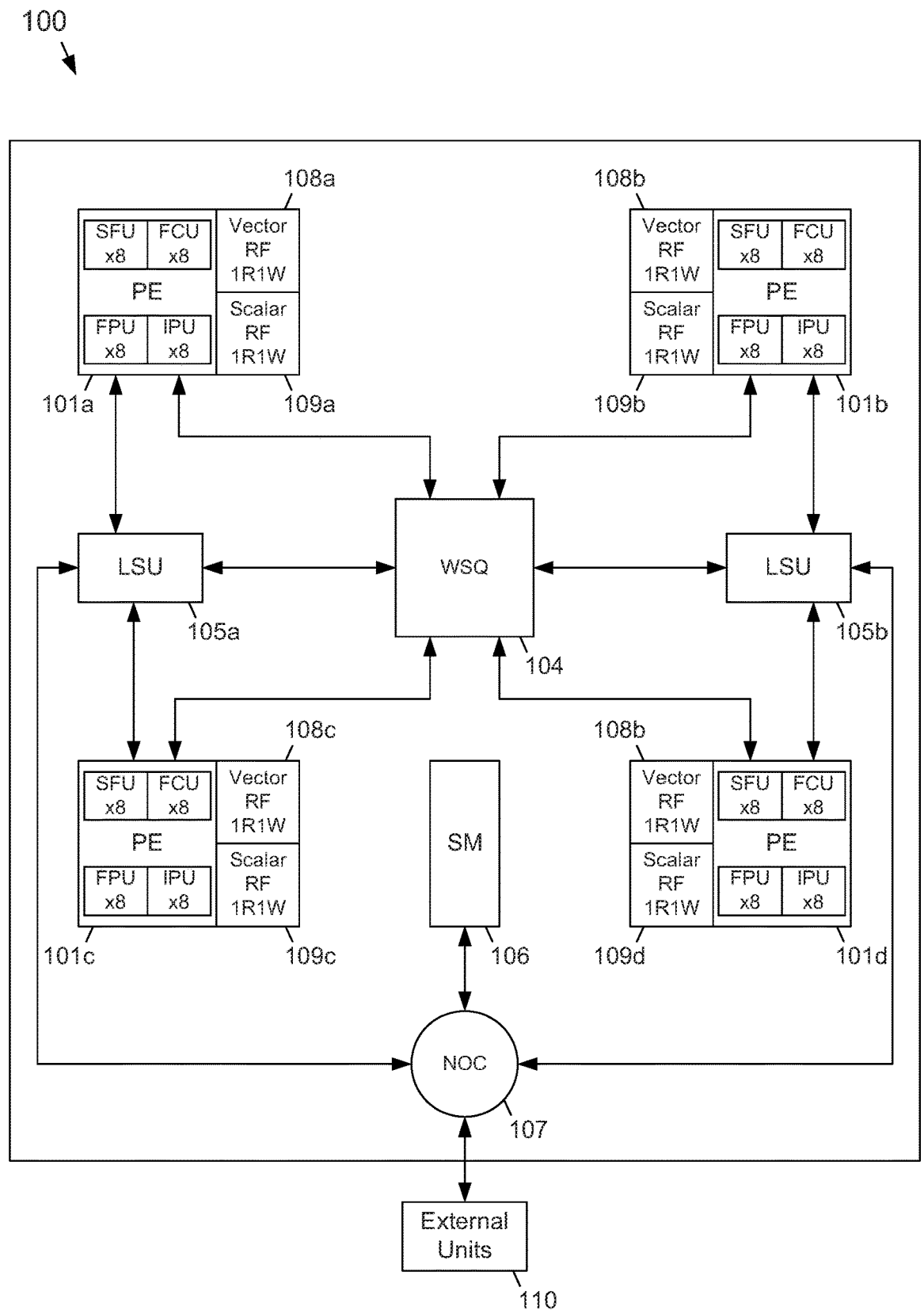
FIG. 1 depicts a block diagram of an example embodiment of a typical shader core that includes four processing engines.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

As used herein, the term "processing element" refers to a generic processor capable of executing instruction streams in a non-stallable fashion. The term "processing-element cluster" (PEC), as used herein, refers to a multiplicity of processing elements providing a parallel-processing array. For example, there may be four PEs per cluster (also referred to as a PE-Quad), although the total number of PEs per cluster may vary. The term "thread," as used herein, refers to a point of control that can execute instructions. The term "trace," as used herein, refers to a collection of instructions run in a non-stalling continuous sequence. For example, a program executed on a PE may include one or more traces. Branch targets may be within or beyond a currently executing trace.

The term "warp," as used herein, refers to a collection of a plurality of threads. The active state of each thread may be controlled by a corresponding bit in an execution mask. A PE may contain sufficient storage to allow switching among a collection of warps to maximize efficiency when a warp cannot proceed when waiting for a resource. To clarify, a trace may require one or more cycles to execute: that is, one cycle or multiple cycles per instruction if there is temporal multiplexing dedicated to each instruction in the trace. A warp may refer to all the threads executing in a cycle. Thus, at the end of a trace, the total number of operations performed may be length (trace)×width (warp). A "trace header," as used herein, refers to information related to a trace that may be used by a warp sequencer unit for scheduling the trace to a PE. A warp sequencer unit may include a "top of the instruction pipeline" (PEC.WSQ.TotIP) that may include logic in which program instructions may be initially parsed and where (and when) it may be determined whether an instruction is a branch, and the logic may provide control signals to circuitry in the PE to effect a branch instruction.

The term "vector register file" (vRF), as used herein, refers to a large memory supporting a PE that provides per-thread storage, and may be generally accessible by the PE and an external agent or unit. The vRF may provide a branch target address (BTA) for instructions that may select branch targets. The BTA may be the program counter (PC) address where the thread will execute if a branch is taken. The term "scalar register file" (sRF), as used herein, refers to a large memory supporting a PE, but providing a single value that may be sharable among threads. In general, the vRF is considerably larger than the sRF, but each may be implemented in an area-efficient SRAM.

The subject matter disclosed herein provides a shader core having an improved performance without replicating PEs, that is, without generally doubling the size of the shader core. Thus, a shader core according to the subject matter disclosed herein provides an improved performance/mm$^2$. In one embodiment, a PE that is configured with a full complement of execution units may be paired with a PE that is configured with less than a full complement of execution units. A PE having a full complement of execution unit is referred to herein as a heavy-weight PE (PE-H), whereas a PE configured with less than a full complement of execution units is referred to herein as a light-weight PE (PE-L). A PE-L may be configured to include only selected execution units based on a particular design of the shader core.

A warp may be executed by a combination formed by a pair of a PE-H and a PE-L. A compiler may generate a trace containing a trace header that may be processed by a warp sequencer unit and that indicates whether instructions of the trace may be executed in a PE-L. The warp sequencer unit may schedule traces of a warp sequentially—either to the PE-H or to the PE-L of a pair—and may schedule a trace of another warp to the other unit of the PE-H/PE-L pair. A vector register file and a scalar register file used by the PE-H/PE-L pair may each be modified to provide two-read ports and two write ports that enables the vector register file and the scalar register file to be shared between the PE-H/PE-L pair. A load-store unit may access the vector register file and the scalar register file only through the PE-H and not through the PE-L. The load-store unit essentially serves both the PE-H and PE-L through the two-read ports and two write ports of the vector register file and the scalar register file serving both the PE-H/PE-L pair.

The number of warps that the warp sequencer unit may schedule may be the same as if all PEs of a shader core were PE-H processing engines. The number of warps that a PE-H and a PE-L may execute together also remains the same as if all PEs of a shader core were PE-H processing engines. Warps may execute faster on a PE-H/PE-L pair because according to the subject matter disclosed herein, there are two PEs executing a warp. Also, a PE-H/PE-L pair may be considered to be a single unit having a single assigned PE identification (PEID), so that units external to the shader core disclosed herein require no changes, other than the changes to the warp sequencer unit as described herein.

FIG. 1 depicts a block diagram of an example embodiment of a typical shader core 100 that includes four processing engines. The shader core 100 may include one or more processing engines (PEs) 101, a warp sequencer (WSQ) unit 104, one or more LSUs 105, a shared memory (SM) 106 and a network on a chip (NOC) 107. The example shader core 100 depicted in FIG. 1 includes four PEs (PE-Quad) respectively designated as 101a-101d. Components associated with a particular PE are indicated by the same suffix designator as the corresponding PE. The example shader core 100 is also depicted with two LSUs, which are respectively indicated as LSU 105a and 105b. In the embodiment of the shader core 100 depicted in FIG. 1, each LSU 105 serves two PEs 101. In an alternative embodiment, an LSU 105 may serve one or more PEs 101.

A PE 101 may decode and execute instructions along with some form of dispatch support for movement of data to and from a texture unit (not shown), an interpolator and rasterizer unit (not shown), a level 1 cache (L1C) unit (not shown), and/or other units (not shown) that are external to the shader core 100.

A PE may include one or more execution units, such as one or more floating point units (FPUs), one or more integer processing units (IPUs), one or more special-function units (SFUs) and/or one or more format conversion units (FCUs). An FPU may perform floating point instruction execution, and an IPU may perform signed and unsigned Integer instruction execution. An SFU may perform instruction execution for, for example, a sine, a cosine, a reciprocal or a square-root function. An FCU may convert a data format from/to a floating point format and an integer format. Other functions not listed may be provided by one or more execution units. A PE 101 may include multiple instances of specific execution units. For example, a PE may include eight (×8) FPUs, eight IPUs, eight SFUs, and eight FCUs. Other numbers of instances of particular types of execution units and/or groupings of particular types of execution units are also possible.

A PE 101 may also include register files (RFs) that may contain data for instruction execution and may store results from the execution units within the PE 101. The main register files in a PE 101 may include a vector RF 108 and a scalar register file 109. A tunnel register (not shown) may also be included. The vector RF 108 may contain and may be organized as data per thread. The vector RF 108 may typically include one read port (1R) and one write port (1W). The scalar RF 109 may contain data that is common to all threads, and may typically include one read port (1R) and one write port (1W).

The WSQ 104 may schedule instructions to all available instances of the PEs 101 in the shader core 100. A work request received by the WSQ 104 may be organized in terms of a warp, which is essentially one or more groups of instructions. The WSQ 104 may have multiple warps available from which to schedule instructions to a PE 101. The WSQ 104 may efficiently sequence instructions in order to keep a PE 101 busy most of the time while maintaining dependencies between instructions of a warp. A warp may be made up of multiple traces that contain group of instructions that may be executed back-to-back without any dependencies from units external to a PE 101.

An LSU 105 may work closely with one or more corresponding PEs 101 and the WSQ 104 to dispatch data to and fetch data from the PE 101 and may communicate with various units (i.e., shader program constructors, vertex attribute generators, etc. (not specifically shown)) that are external to the shader core 100 to initialize warp-related data for a PE 101.

The SM 106 may be a local memory within the shader core 100. The NOC 107 may be a switch through which units within the shader core 100 and units 110 external to the shader core 100 communicate.

Utilization of the execution units within a PE varies depending upon the execution unit. For example, floating-point instructions may be the type of instruction most frequently executed in a typical shader program. Replicating a PE as an approach to improve performance of a GPU, however, also replicates relatively less-used execution units along with relatively more frequently used execution units.

Figure 2:
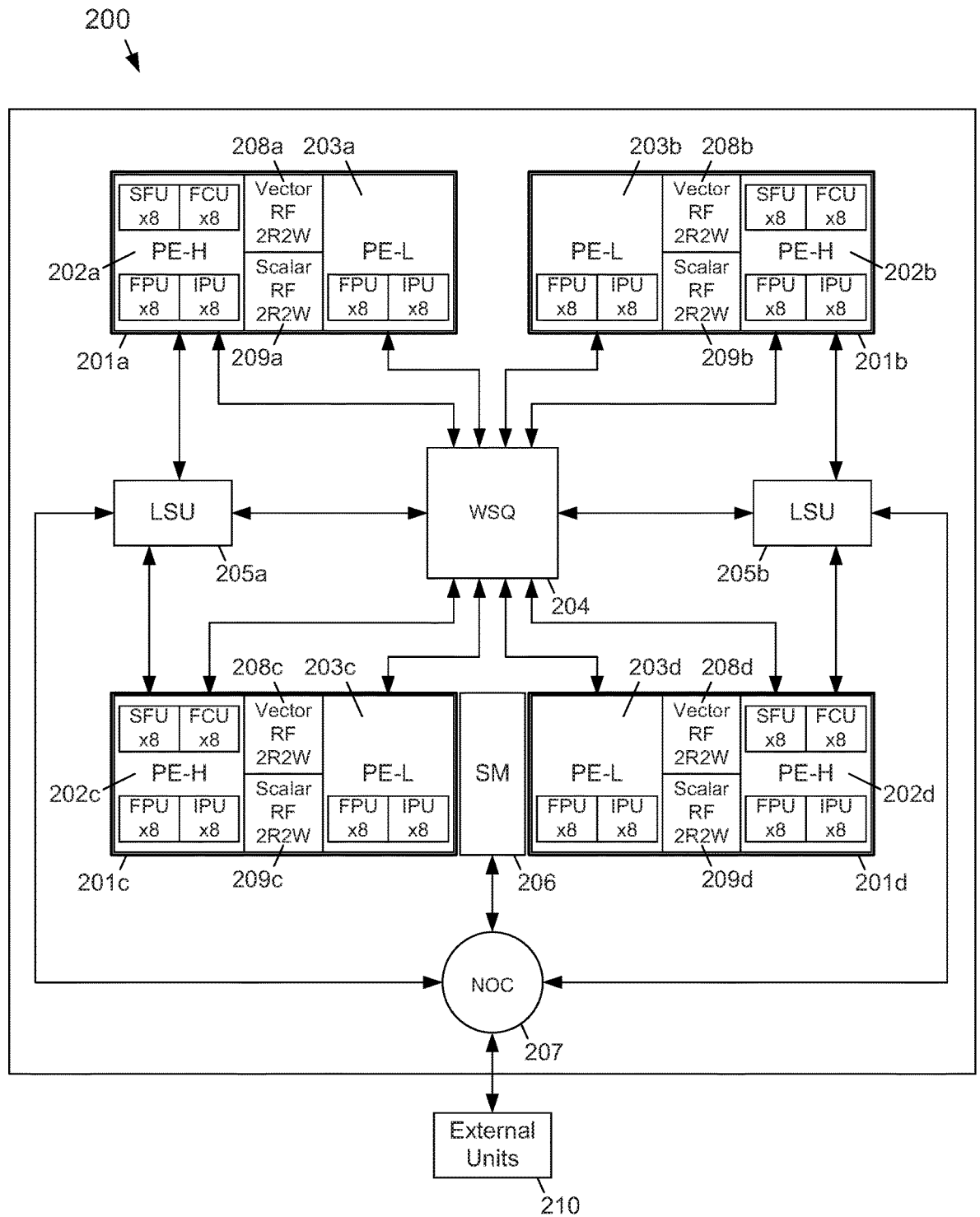
FIG. 2 depicts a block diagram of an example embodiment of a shader core that includes four pairs of heavy-weight and light-weight processing engines according to the subject matter disclosed herein.

FIG. 2 depicts a block diagram of an example embodiment of a shader core 200 that includes four pairs of heavy-weight and light-weight processing engines according to the subject matter disclosed herein. The shader core 200 provides an improved performance without PEs being replicated, that is, without generally doubling the size of the shader core 200. The shader core 200 may include one or more PEs 201, a WSQ unit 204, one or more LSUs 205, an SM 206 and a NOC 207. Components associated with a particular PE 201 are indicated by the same suffix designator as the corresponding PE. The example shader core 200 is also depicted with two LSUs, which are respectively indicated as LSU 205a and 205b. In the embodiment depicted in FIG. 2, each LSU 205 serves two PEs 201. In an alternative embodiment, an LSU 205 may serve one or more PEs 201. In one embodiment, the example embodiment of a shader core 200 may be utilized with a trace-based shader core design.

In one embodiment, the shader core 200 may be a high-performance, multiple-thread machine, such as a Single-Instruction-Multiple-Thread (SIMT). One embodiment may provide eight spatial lanes operating over four cycles to perform 32 threads worth of work. The various components and/or functional blocks disclosed herein as forming the shader core 200 may be embodied as modules that may include software, firmware and/or hardware that provide functionality described herein in connection with the various components and/or functional blocks.

The example embodiment of the shader core 200 depicted in FIG. 2 includes four PEs that each are formed from a PE-H 202 and a PE-L 203 that have been paired together. A PE-H may include, for example, eight (×8) FPUs, eight IPUs, eight SFUs, and eight FCUs. Other numbers of instances of particular types of execution units and/or groupings of particular types of execution units included in PEs of a shader core are also possible for a shader core to be considered to be a PE-H. The relatively fewer execution units associated with a PE-L 203 provides an area savings. In an alternative embodiment of the shader core 200, one or more PEs 201 of a shader core 200 may not include a paired PE-H 202 and PE-L 203, but may be configured to only include a PE-H 202.

A PE 201 may decode and execute instructions along with some form of dispatch support for movement of data to and from a texture unit (not shown), an interpolator and rasterizer unit (not shown), a level 1 cache (L1C) unit (not shown), and/or other units (not shown) that are external to the shader core 200.

Both a PE-H 202 and a PE-L 203 may include one or more execution units, such as one or more FPUs, one or more IPUs, one or more SFUs and/or one or more FCUs. Generally, however, a PE-L 203 may include fewer execution units than a PE-H 202. As depicted in FIG. 2, each PE-H 202 includes eight (×8) FPUs, eight IPUs, eight SFUs, and eight FCUs, whereas each PE-L 203 includes eight FPUs and eight IPUs. In alternative embodiments, a PE-H 202 may include a different combination of the different types of execution units, and a PE-L 203 may similarly include a different combination of the different types of execution units. It should be understood that other functions not listed may be provided by one or more execution units.

A PE 201 may also include register files (RFs) that may contain data for instruction execution and may store results from the execution units within both the PE-H 202 and the PE-L 203 of the PE 201. A tunnel register (not shown) may also be included. The size of the RF may be generally unchanged from the RFs associated with the typical PEs 101 of FIG. 1. The total number of warps that may execute in a PE-H/PE-L pair may be the same as for a typical PE 101. The main register files in PE 201 may include a vector RF 208 and a scalar register file 209 that are shared by the PE-H/PE-L pair of the PE 201. The vector RF 208 may contain data per thread, and may include two read ports (2R) and two write ports (2W). One read port of the vector RF 208 may be allocated to the PE-H 202 and the other read port of the vector RF 208 may be allocated to the PE-L 203. Similarly, one write port of the vector RF 208 may be allocated to the PE-H 202 and the other write port of the vector RF 208 may be allocated to the PE-L 203. The scalar RF 209 may contain data that is common to all threads, and may include two read ports (2R) and two write ports (2W) to avoid read conflicts between the PE-H 202 and the PE-L 203 of the PE 201. One read port of the scalar RF 208 may be allocated to the PE-H 202 and the other read port of the scalar RF 208 may be allocated to the PE-L 203. One write port of the scalar RF 208 may be allocated to the PE-H 202 and the other write port of the scalar RF 208 may be allocated to the PE-L 203 to avoid write conflicts between the PE-H 202 and the PE-L 203 of the PE 201.

The WSQ 204 may schedule instructions to all available instances of the PEs 201. A work request received by the WSQ 204 may be organized in terms of a warp, which, as previously indicated, is essentially one or more groups of instructions. The WSQ 204 may have multiple warps available from which to schedule instructions to a PE 201. The WSQ 204 may be configured to schedule instructions to the PE-H 202 and to the PE-L 203 of the shader core 200 that may be appropriately executed by the particular PE. That is, if an instruction involves an execution unit that a PE-L 203 does not include, the instruction may be scheduled to a PE-H or a PE-L that includes the appropriate execution unit. In one embodiment, a compiler may insert a hint flag or other indication in a trace header to indicate to the WSQ 204 whether the trace may be scheduled to a PE-L.

The WSQ 204 may efficiently sequence instructions in order to keep a PE 201 busy most of the time along while maintaining dependencies between instructions of a warp. Similar to the embodiment of the shader core depicted in FIG. 1, a warp may be made up of multiple traces that contain group of instructions that may be executed back-to-back without any dependencies from units external to a PE 201.

An LSU 205 may be configured to only access a PE-H 202 and not any of the PE-L 203s. Accordingly, any read- and write-related circuitry and logic is not needed for the LSU 205 to access a PE-L 203, thereby providing an additional area savings. Similar to an LSU 105 depicted in FIG. 1, an LSU 205 may work closely with one or more corresponding PEs 201 and the WSQ 204 to dispatch data to and fetch data from the PE 201. Additionally, an LSU 205 may communicate with various units (i.e., shader program constructors, vertex attribute generators, etc. (not specifically shown)) that are external to the shader core 200 to initialize warp-related data for a PE 201.

The SM 206 may be a local memory within the shader core 200. The NOC 207 may be a switch through which units within the shader core 200 and units 210 external to the shader core 200 communicate.

In one embodiment, changing of the vRF from having a 1R1 W port to having a 2R2 W port may limit the potential area gains provided by the subject matter disclosed herein. To minimize this possible impact, in one embodiment, the micro-architecture of the PE 201 may be changed so that the vector RF may be accessed only during alternate cycles for instruction-related reads or writes. Such a change would mean that each read or write access performs a read or write of two threads worth of data that may can be used for two consecutive cycles. Thus, two consecutive cycles are combined and read or written together in a single access, thereby leaving every other cycle free. Additionally, the vector RF may be divided into two banks in which odd registers are in one bank and even registers are in the other. A compiler may be configured to use one odd and one even vector register in an instruction that needs two vector registers. The WSQ may be configured so that instructions scheduled to a PE-H/PE-L pair may be shifted by a cycle so that the alternate access slot made available may be used by the PE-L for accessing the vector RF. A third vector read may be provided by a tunnel register file. As used herein, the term "tunnel register file" is a temporary register file that may provide a vector source and which may be discarded after the trace finishes.

Figure 3:
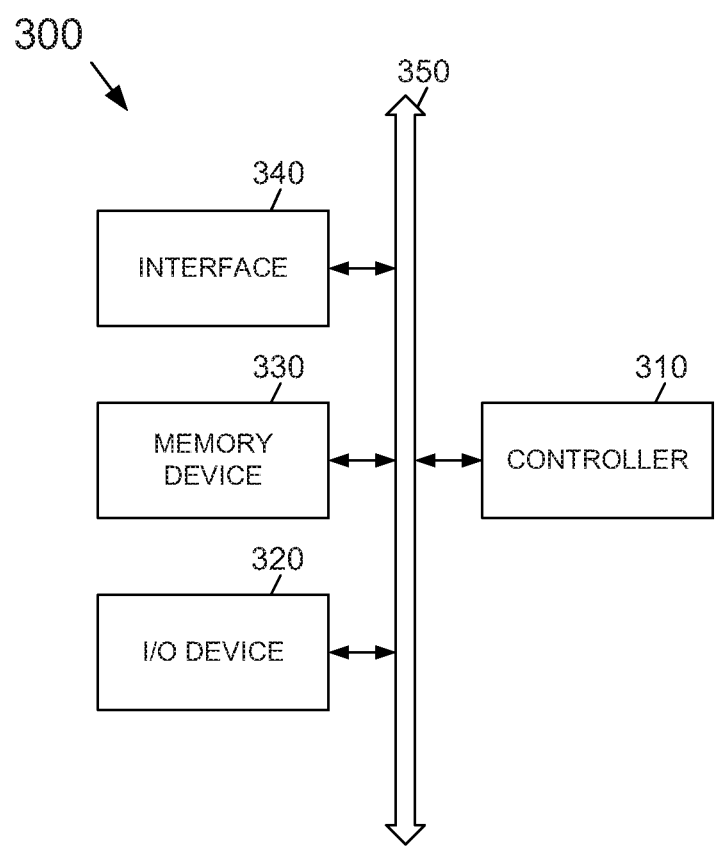
FIG. 3 depicts an electronic device that includes a shader core according to the subject matter disclosed herein.

FIG. 3 depicts an electronic device 300 that includes a shader core according to the subject matter disclosed herein. Electronic device 300 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 300 may include a controller 310, an input/output device 320 such as, but not limited to, a keypad, a keyboard, a display, a touch-screen display, a camera, and/or an image sensor, a memory 330, and an interface 340 that are coupled to each other through a bus 350. The controller 310 may include, for example, at least one microprocessor, at least one digital signal process, at least one microcontroller, or the like. The memory 330 may be configured to store a command code to be used by the controller 310 or a user data.

Electronic device 300 and the various system components of electronic device 300 may include a shader core according to the subject matter disclosed herein. The interface 340 may be configured to include a wireless interface that is configured to transmit data to or receive data from a wireless communication network using a RF signal. The wireless interface 340 may include, for example, an antenna, a wireless transceiver and so on. The electronic system 300 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices).

The operations described in this specification may be implemented as operations performed by a data-processing apparatus on data stored on one or more computer-readable storage devices or received from other sources.

The term "data-processing apparatus" encompasses all kinds of apparatus, devices and machines for processing data, including by way of example, a programmable processor, a computer, a system on a chip, or multiple ones, or combinations, of the foregoing The apparatus may include special-purpose logic circuitry, e.g., an FPGA (field programmable gate array) or an ASIC (application-specific integrated circuit). The apparatus may also include, in addition to hardware, code that creates an execution environment for the computer program, e.g., code that constitutes processor firmware, a protocol stack, a database-management system, an operating system, a cross-platform runtime environment, a virtual machine, or a combination thereof. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus can also be implemented as, special-purpose logic circuitry, e.g., an FPGA (field programmable gate array) or an ASIC (application-specific integrated circuit).

Processors suitable for the execution of a computer program include, by way of example, both general-purpose and special-purpose microprocessors, and any one or more processors of any kind of digital computer. Generally, a processor may receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer, however, need not have such devices. Moreover, a computer may be embedded in another device, e.g., a mobile telephone, a personal-digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special-purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, with which the user can provide input to the computer. Other kinds of devices can be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back-end component, e.g., as a data server, or that includes a middleware component, e.g., an application server, or that includes a front-end component, e.g., a user computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include users and servers. A user and a server are generally remote from each other and typically interact through a communication network. The relationship of user and server arises by virtue of computer programs running on the respective computers and having a user-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A shader core, comprising:
a first processing element (PE) comprising a first predetermined number of execution units;
a second PE comprising a second predetermined number of execution units, the second predetermined number of execution units being less than the first predetermined number of execution units;
a register file shared by the first PE and the second PE;
a load-store unit (LSU) coupled to the first PE, the LSU accessing the register file through the first PE and the LSU unable to access the second PE, the LSU serving both the first PE and the second PE through the first PE; and
a warp sequencer unit (WSQ) coupled to the first PE and to the second PE, the WSQ scheduling an instruction trace to execute on the first PE or the second PE based on information contained in a trace header of the instruction trace.

2. The shader core of claim 1, wherein the information contained in the trace header indicates whether the instruction trace is executable on the second PE.

3. The shader core of claim 1, wherein the first predetermined number of execution units comprises a third predetermined number of types of execution units, and
wherein the second predetermined number of execution units comprises a fourth predetermined number of types of execution units, the fourth predetermined number of types of execution units being less than the third predetermined number of types of execution units.

4. The shader core of claim 3, wherein the fourth predetermined number of types of execution units includes a floating-point-type of execution unit and an integer-processing-type of execution unit.

5. The shader core of claim 3, wherein the third predetermined number of types of execution units includes at least one of a floating-point-type of execution unit, an integer-processing-type of execution unit, a sine-function-type of execution unit, a cosine-function-type of execution number, a reciprocal-function-type of execution unit, a square-root-function-type of execution unit, and a format-conversion-type execution unit.

6. The shader core of claim 1, wherein the register file comprises a vector register file and a scalar register file.

7. The shader core of claim 6, wherein the vector register file comprises two read ports and two write ports, and
wherein the scalar register file comprises two read ports and two write ports.

8. The shader core of claim 1, wherein the shader core is part of a graphics processing unit (GPR) that comprises at least one shader core.

9. A graphics processor unit (GPU), comprising:
at least one shader core, the shader core comprising:
a first processing element (PE) comprising a first predetermined number of execution units;
a second PE comprising a second predetermined number of execution units, the second predetermined number of execution units being less than the first predetermined number of execution units;
a register file shared by the first PE and the second PE;
a load-store unit (LSU) coupled to the first PE, the LSU accessing the register file through the first PE and the LSU unable to access the second PE, the LSU serving both the first PE and the second PE through the first PE; and
a warp sequencer unit (WSQ) coupled to the first PE and to the second PE, the WSQ scheduling an instruction trace to execute on the first PE or the second PE based on information contained in a trace header of the instruction trace.

10. The GPU of claim 9, wherein the information contained in the trace header indicates whether the instruction trace is executable on the second PE.

11. The GPU of claim 9, wherein the first predetermined number of execution units comprises a third predetermined number of types of execution units, and
wherein the second predetermined number of execution units comprises a fourth predetermined number of types of execution units, the fourth predetermined number of types of execution units being less than the third predetermined number of types of execution units.

12. The GPU of claim 11, wherein the fourth predetermined number of types of execution units includes a floating-point-type of execution unit and an integer-processing-type of execution unit.

13. The GPU of claim 11, wherein the third predetermined number of types of execution units includes at least one of a floating-point-type of execution unit, an integer-processing-type of execution unit, a sine-function-type of execution unit, a cosine-function-type of execution number, a reciprocal-function-type of execution unit, a square-root-function-type of execution unit, and a format-conversion-type execution unit.

14. The GPU of claim 9, wherein the register file comprises a vector register file and a scalar register file.

15. The GPU of claim 14, wherein the vector register file comprises two read ports and two write ports, and
wherein the scalar register file comprises two read ports and two write ports.

16. A graphics processor unit (GPU), comprising:
at least one shader core, the shader core comprising:
a first processing element (PE) comprising a first predetermined number of types of execution units;
a second PE comprising a second predetermined number of types of execution units, the second predetermined number of types of execution units being less than the first predetermined number of types of execution units;
a register file shared by the first PE and the second PE;
a load-store unit (LSU) coupled to the first PE, the LSU accessing the register file through the first PE and the LSU unable to access the second PE, the LSU serving both the first PE and the second PE through the first PE; and
a warp sequencer unit (WSQ) coupled to the first PE and to the second PE, the WSQ scheduling an instruction trace to execute on the first PE or the second PE based on information contained in a trace header of the instruction trace, the information contained in the trace header indicating whether the instruction trace is executable on the second PE.

17. The GPU of claim 16, wherein the second predetermined number of types of execution units includes a floating-point-type of execution unit and an integer-processing-type of execution unit.

18. The GPU of claim 16, wherein the first predetermined number of types of execution units includes at least one of a floating-point-type of execution unit, an integer-processing-type of execution unit, a sine-function-type of execution unit, a cosine-function-type of execution number, a reciprocal-function-type of execution unit, a square-root-function-type of execution unit, and a format-conversion-type execution unit.

19. The GPU core of claim 16, wherein the register file comprises a vector register file and a scalar register file,
   wherein the vector register file comprises two read ports and two write ports, and
   wherein the scalar register file comprises two read ports and two write ports.

* * * * *